(12) United States Patent
Song et al.

(10) Patent No.: US 9,658,646 B2
(45) Date of Patent: May 23, 2017

(54) DISPLAY APPARATUS

(71) Applicant: LG Electronics Inc., Seoul (KR)

(72) Inventors: Hyeoncheol Song, Seoul (KR); Ahreum Lee, Seoul (KR); Jinsu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 14/183,857

(22) Filed: Feb. 19, 2014

(65) Prior Publication Data

US 2014/0314999 A1 Oct. 23, 2014

(30) Foreign Application Priority Data

Apr. 18, 2013 (KR) .......... 10-2013-0043036

(51) Int. Cl.
*G06F 1/16* (2006.01)
*G09F 9/30* (2006.01)
*G09F 15/00* (2006.01)

(52) U.S. Cl.
CPC .......... *G06F 1/1601* (2013.01); *G09F 9/30* (2013.01); *G09F 9/301* (2013.01); *G09F 15/0018* (2013.01); *G09F 15/0025* (2013.01); *G09F 15/0031* (2013.01); *Y10T 428/24628* (2015.01)

(58) Field of Classification Search
CPC .......... D01F 9/10; D04H 1/4242; F41B 5/12
USPC .................. 349/11; 428/426, 114
See application file for complete search history.

(56) References Cited

U.S. PATENT DOCUMENTS

| | | | | |
|---|---|---|---|---|
| 5,201,979 A | * | 4/1993 | Koba | B29C 70/504 100/212 |
| 7,790,637 B2 | * | 9/2010 | DiFonzo | B29C 70/083 442/179 |
| 2004/0182285 A1 | * | 9/2004 | Mazany | B32B 33/00 106/600 |
| 2009/0110872 A1 | | 4/2009 | DiFonzo et al. | |
| 2010/0045919 A1 | * | 2/2010 | Chida et al. | 349/149 |
| 2010/0289390 A1 | * | 11/2010 | Kenney | B29C 43/006 312/223.1 |
| 2011/0018820 A1 | * | 1/2011 | Huitema | G06F 1/1601 345/173 |
| 2011/0249425 A1 | * | 10/2011 | Aurongzeb | F21V 14/02 362/102 |
| 2012/0281367 A1 | | 11/2012 | He et al. | |
| 2013/0044042 A1 | * | 2/2013 | Olsson et al. | 345/8 |
| 2013/0114193 A1 | * | 5/2013 | Joo | F16M 11/08 361/679.01 |
| 2014/0118910 A1 | * | 5/2014 | Sung | G09F 9/301 361/679.01 |
| 2014/0226266 A1 | * | 8/2014 | Kang | H01L 51/0097 361/679.01 |

(Continued)

FOREIGN PATENT DOCUMENTS

| | | |
|---|---|---|
| CN | 101663161 A | 3/2010 |
| CN | 101887660 A | 11/2010 |

(Continued)

*Primary Examiner* — Aaron Austin
*Assistant Examiner* — Laura Figg
(74) *Attorney, Agent, or Firm* — Dentons US LLP

(57) ABSTRACT

A display apparatus includes a display module, and a varying member for varying a shape of the display module. The varying member includes a variable portion including at least one composite material layer made of a composite material.

20 Claims, 6 Drawing Sheets

(56) References Cited

U.S. PATENT DOCUMENTS

| | | | | |
|---|---|---|---|---|
| 2015/0195932 A1* | 7/2015 | Lee | ..................... | H05K 5/0217 |
| | | | | 361/749 |
| 2015/0296641 A1* | 10/2015 | Song | ................... | H05K 5/0217 |
| | | | | 361/679.01 |
| 2016/0192519 A1* | 6/2016 | Song | ................... | H05K 5/0217 |
| | | | | 361/679.01 |

FOREIGN PATENT DOCUMENTS

| CN | 101915999 A | 12/2010 |
|---|---|---|
| CN | 102057317 A | 5/2011 |
| CN | 202871202 U | 4/2013 |
| CN | 103093699 A | 5/2013 |
| EP | 2759903 A2 | 7/2014 |
| JP | 10-26754 A | 1/1998 |
| JP | 2005-331872 A | 12/2005 |
| JP | 2006-23676 A | 1/2006 |

\* cited by examiner

FIG. 1
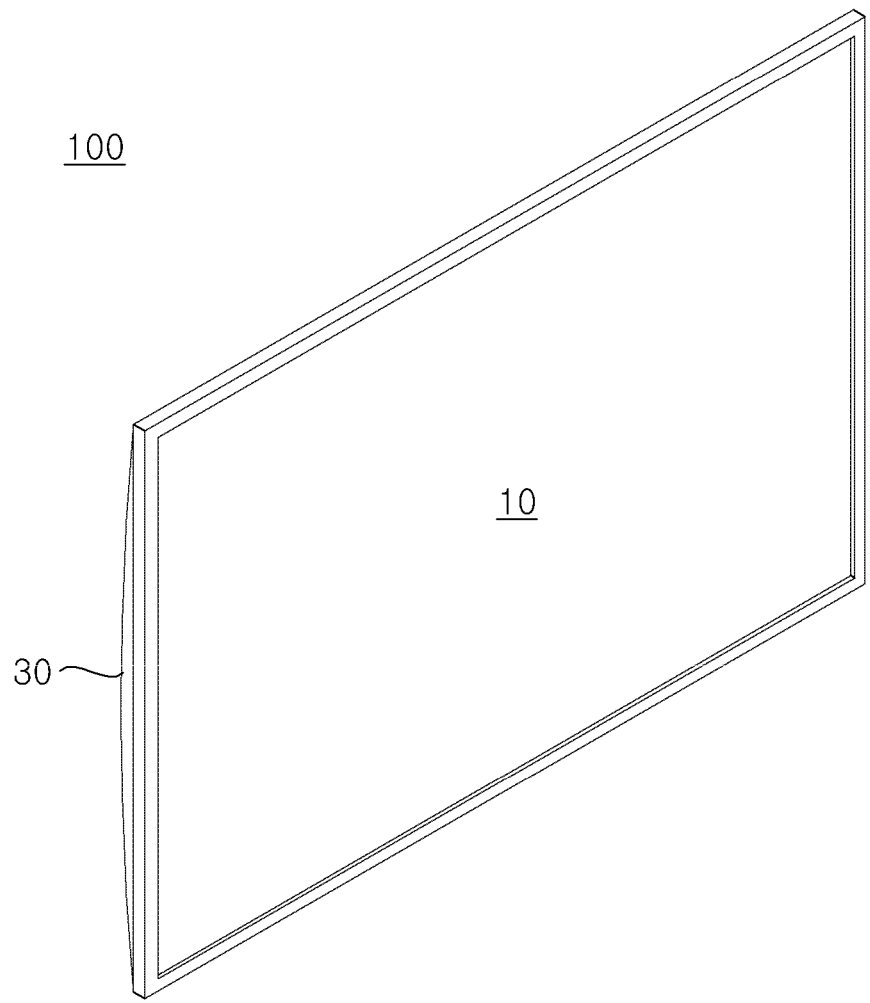
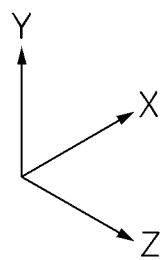

FIG. 3
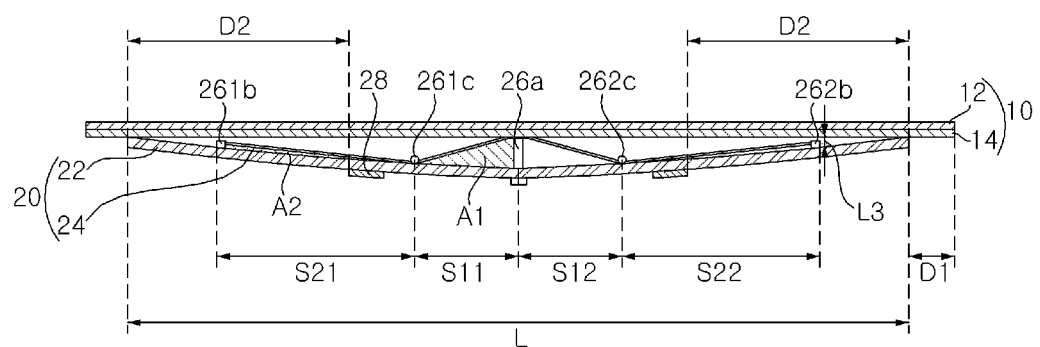
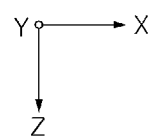

FIG. 6
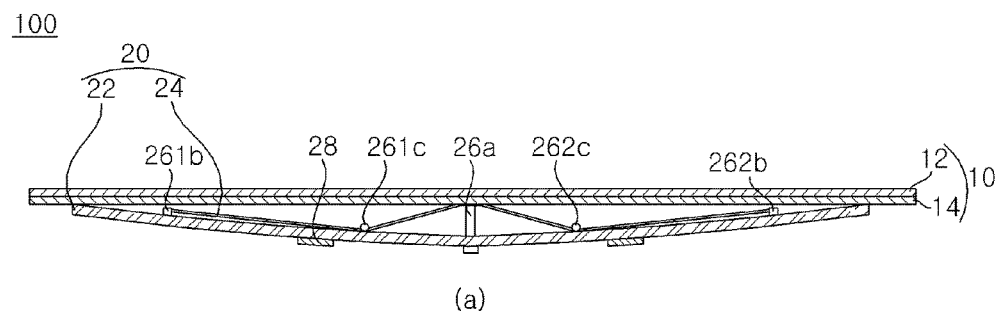
(a)
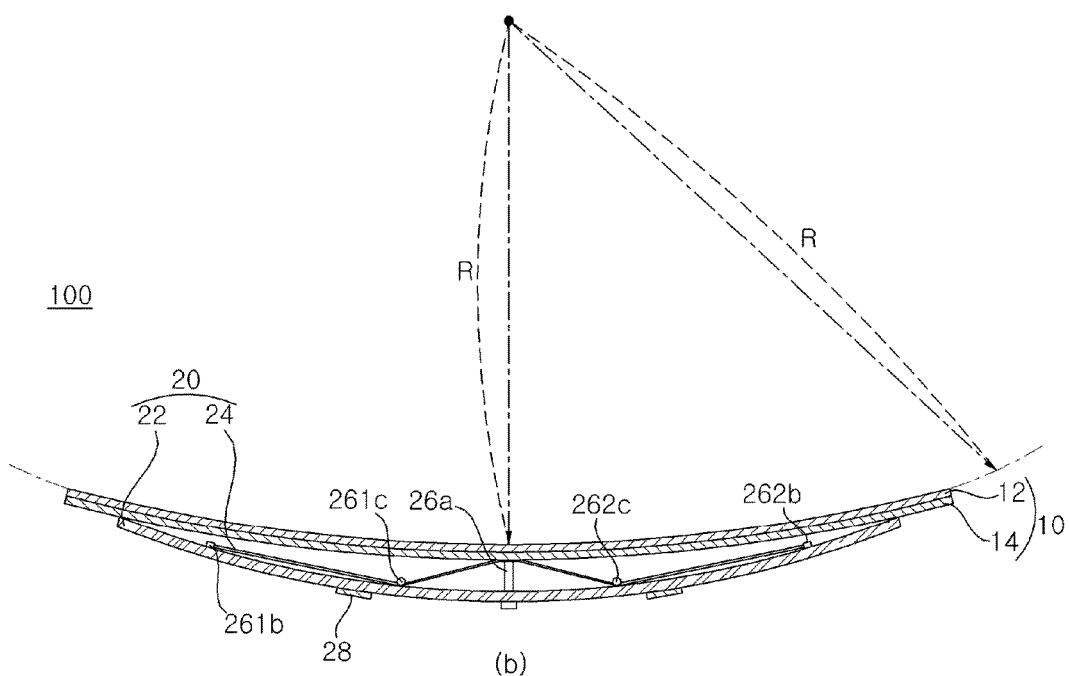
(b)

DISPLAY APPARATUS

CROSS-REFERENCE TO RELATED APPLICATION

This application claims the priority benefit of Korean Patent Application No. 10-2013-0043036 filed on Apr. 18, 2013 in the Korean Intellectual Property Office, the disclosure of which is incorporated herein by reference.

BACKGROUND

1. Field of the Disclosure

The present disclosure relates to a display apparatus, and more particularly to a display apparatus with an improved structure.

2. Description of the Related Art

Various types of display apparatuses are used to render images. For example, there are various displays such as a liquid crystal display panel, a plasma display panel, and an organic light emitting diode display panel.

In accordance with recent expansion of application fields of display apparatuses, diverse characteristics of display apparatuses are now required in the application fields. In particular, such requirements have been increased in association with characteristics related not only to simple display of images, but also to display of images taking into consideration three-dimensional effects and sensory immersion. In order to meet such various requirements, research is being conducted to provide various display apparatuses having improved structures.

SUMMARY

Therefore, in view of the above, one object is to provide a display apparatus having an improved structure capable of achieving an enhancement in sensory immersion of the user.

In accordance with one aspect, the above and other objects may be accomplished by the provision of a display apparatus including a display module, and a varying member for varying a shape of the display module. The varying member includes a variable portion including at least one composite material layer made of a composite material.

BRIEF DESCRIPTION OF THE DRAWINGS

The above and other objects, features and other advantages may be more clearly understood from the following detailed description taken in conjunction with the accompanying drawings, in which:

FIG. 1 is a front perspective view of a display apparatus according to an exemplary embodiment of the present invention;

FIG. 3 is a cross-sectional view taken along line III-III of FIG. 2, illustrating the display apparatus;

FIG. 6(a)-6(b) are views explaining shape variation of the display apparatus according to an exemplary embodiment of the present invention.

DETAILED DESCRIPTION OF THE PREFERRED EMBODIMENTS

Figure 2:
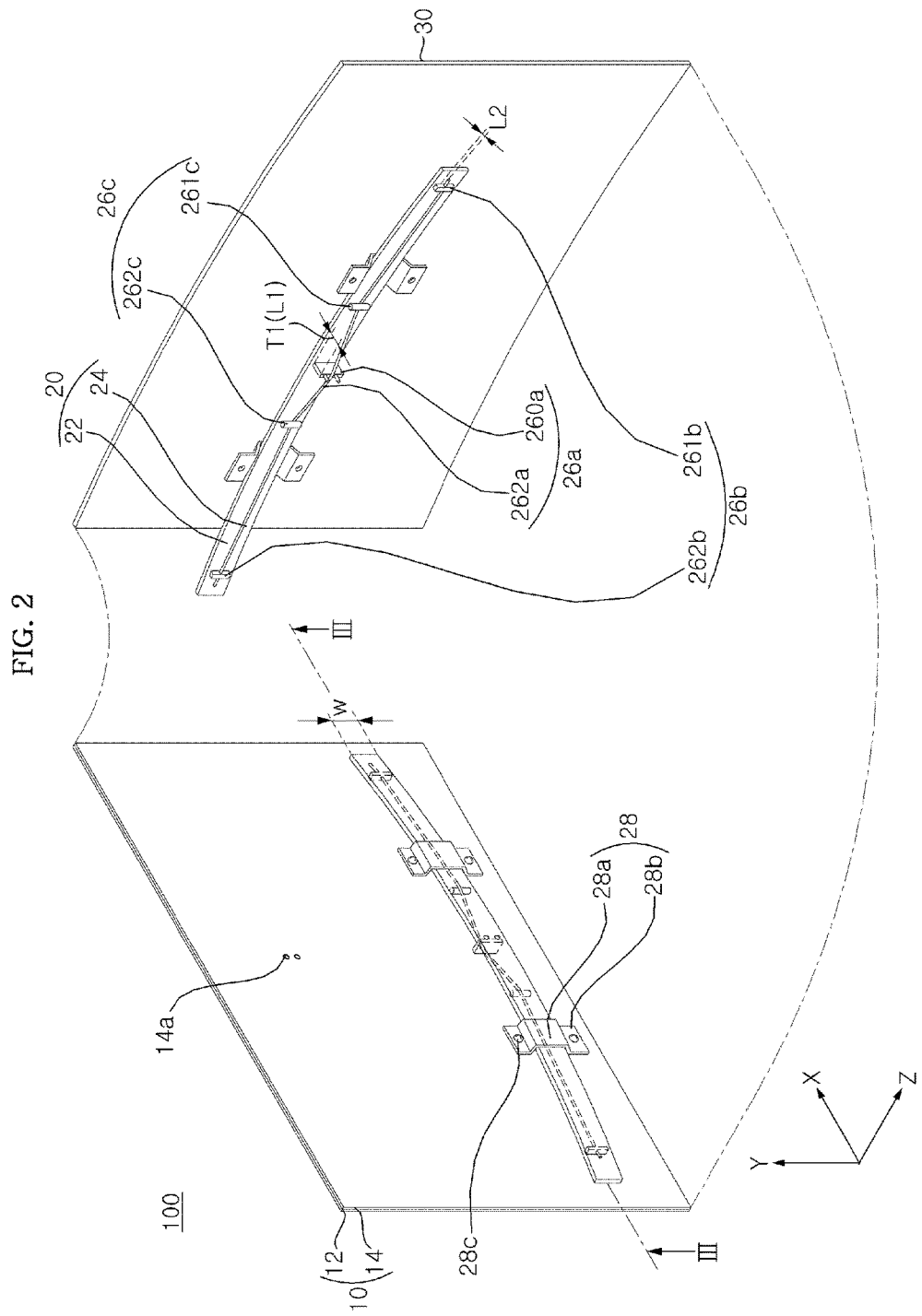
FIG. 2 is an exploded rear perspective view of the display apparatus according to the illustrated embodiment of the present invention.

Reference will now be made in detail to preferred embodiments of the present invention, examples of which are illustrated in the accompanying drawings. These embodiments are not intended to limit the present invention. Other embodiments may also be provided.

Constituent elements other than elements constituting features that aid in the understanding of the present disclosure may be omitted from the drawings, for clarity of description. Like reference numerals refer to like elements throughout. In the drawings, the widths, thicknesses, and etc., of constituent elements may be exaggerated or reduced for clarity and convenience of illustration. The present invention is not limited to the illustrated thicknesses, widths, and etc.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, in the description of the embodiments, it will be understood that when a layer (or film), a region, a pad, a pattern or a structure is referred to as being disposed 'on/above/over' another layer, region, pad, pattern or structure, it can be directly in contact with another layer, region, pad, pattern or structure, or one or more intervening layers, regions, pads, patterns or structures may also be present. In addition, it will also be understood that when a layer (or film), a region, a pad, a pattern or a structure are referred to as being disposed 'between' two layers, two regions, two pads, two patterns or two structures, it can be the only layer, region, pad, pattern or structure between the two layers, the two regions, the two pads, the two patterns and the two structures or one or more intervening layers, regions, pads, patterns or structures may also be present.

FIG. 1 is a front perspective view of a display apparatus according to an exemplary embodiment of the present invention. FIG. 2 is an exploded rear perspective view of the display apparatus according to the illustrated embodiment of the present invention. FIG. 3 is a cross-sectional view taken along line III-III of FIG. 2, illustrating the display apparatus. From FIG. 3, a rear cover is omitted for simplicity of illustration.

Referring to FIGS. 1 and 2, the display apparatus of the illustrated embodiment, which is designated by reference numeral "100", includes a display module 10 for rendering an image, and a varying member 20 for varying the shape of the display module 10. The display apparatus 100 may also include a rear cover 30 for covering a rear surface of the display module 10. This will be described in more detail.

The display apparatus 100 is an apparatus for displaying data, images or the like on a screen, to be visible. The display apparatus 100 may include various kinds of articles such as televisions, computer monitors, mobile phones, and e-books.

The display module 10 may include a display panel 12 for substantially rendering an image, a support member 14 disposed at a rear surface of the display panel 12, to support the display panel 12, and a panel driver (not shown) fixed to the support member 14, to provide signals for driving of the display panel 12. Although not shown, the display module 10 may further include frames for enclosing edges of the display panel 12 and support member 14.

In an exemplary embodiment, the display panel 12 may be a panel not only having various structures and types capable of rendering an image, but also having flexibility, to be varied in shape by the varying member 20.

For example, the display panel 12 may be an organic light emitting display panel using organic light emitting diodes (OLEDs). Such an organic light emitting display panel is a self-luminous display panel in which electrons and holes are combined in a fluorescent or phosphorescent organic thin film when current flows through the organic thin film, thereby generating light. The organic light emitting display panel has various advantages of excellent picture quality capable of providing bright and crisp images, no restriction as to viewing angle, and low power consumption. In particular, the organic light emitting display panel exhibits excellent flexibility in that it can be manufactured through lamination of organic thin films. Of course, the present invention is not limited to such a display panel. For the display panel 12, various display panels having various structures and types may be employed.

The support member 14, which is disposed at the rear surface of the display panel 12, supports the display panel 12. The panel driver and varying member 20 may be fixed to a rear surface of the support member 14. As described above, the panel driver drives the display panel 12. To this end, the support member 14 not only has strength to firmly support the display panel 12, panel driver and varying member 20, but also has flexibility and elasticity to be varied in shape in accordance with variation in the shape of the display panel 12. In order to avoid thermal stress, the support member may have a coefficient of thermal expansion similar to that of the display panel 12.

For example, in an exemplary embodiment, the support member 14 may include a composite material such as reinforced plastic. Here, the composite material is a material obtained by artificially combining two or more kinds of materials, to exhibit excellent characteristics. For example, the composite material may include reinforced plastic such as carbon fiber reinforced plastic (CFRP), glass fiber reinforced plastic (GFRP), and etc. In this case, the support member 14 may exhibit not only characteristics of lightness and flexibility by virtue of the resin, but also high strength, high elasticity and excellent wear resistance by virtue of the fiber type reinforcing material. The support member 14 may be constituted by a single composite material layer or may be constituted by a plurality composite material layers, to exhibit excellent strength.

The support member 14 may be fixed to the rear surface of the display panel 12 by an adhesive (for example, a double-sided tape). Of course, the present invention is not limited to such a fixing method. The display panel 12 and support member 14 may be fixed to each other, using various fixing methods.

The panel driver fixed to the rear surface of the support member 14 may include a circuit board (not shown) including various wirings and elements to provide signals for driving of the display panel 12. The panel driver may be fixed to the support member 14 by a bracket (not shown) or the like. For example, the bracket may be fixed to the support member 14 only at a middle portion thereof in order to minimize force required to vary the shape of the display panel 12. Of course, the present invention is not limited to such a structure, and various alternatives may be employed. For example, the panel driver may be partially or completely disposed at the outside of the display module 10. In an exemplary embodiment, the panel driver may include wirings, elements, and etc., for driving of the varying member 20.

In addition, frames may be provided to protect the edges of the display panel 12 and support member 14. Such frames not only protect the display panel 12 and support member 14, but also support the rear cover 30. That is, the rear cover 30 may be fastened to the frames by fastening members (not shown). The frames may have various shapes, and various fastening structures and methods may be employed to fasten the rear cover to the frames and, as such, no detailed description thereof will be given.

The varying member 20 is disposed at the display module 10 (for example, the rear surface of the support member 14), to vary the shape of the display panel 12. The varying member 20 may include a first portion 22 fixed to the support member 14 of the display module 10, and a second portion 24 disposed between the support member 14 and the first portion 22. The second portion 24 is fixed, at opposite ends thereof, to opposite ends of the first portion 22, respectively. The varying member 20 may further include guide members 28 to support the first portion 22 at an inner surface of the guide members 28. In this embodiment, it is possible to vary the shape of the display module 10 by varying the distance, for instance, a rectilinear distance between the opposite ends of the second portion 24 fixed to the first portion 22 (hereinafter, referred to as a "connection length"). Hereinafter, the shapes of the first and second portions 22 and 24 will be described in more detail.

The first portion 22 may have an elongated band shape having a certain width W. Accordingly, it is possible to more effectively apply force to the display module 10. Of course, the present invention is not limited to such a shape, and the first portion 22 may have various shapes.

The second portion 24 may have a structure elongated in the lateral direction of the display module 10 (for example, a wire structure). The connection length of the second portion 24 may be varied by diverse energy (for example, thermal energy, electrical energy, or mechanical energy).

For example, when the second portion 24 is made of a material variable in shape in accordance with a variation in temperature, it is possible to vary the temperature of the second portion 24 and thus, the connection length of the second portion 24 by supplying thermal energy or electrical energy. In this case, the second portion 24 may include a shape memory alloy. A shape memory alloy is an alloy utilizing shape memory and super-plasticity properties exhibited in metals exhibiting austenite-martensite transformation. Such a shape memory alloy has different shapes at different temperatures. The second portion 24 is connected to an element included in the panel driver, to drive the varying member 20, for temperature adjustment thereof. In accordance with temperature adjustment, the connection length of the second portion 24 may be varied. When the second portion 24 includes a shape memory alloy and, as such, the connection length of the second portion 24 is varied by thermal energy or electrical energy, it is possible to achieve a simple structure of the varying member and thus, easy application of the varying member. In addition, there is no noise generated during shape variation of the display module 10.

Alternatively, it may be possible to vary the connection length of the second portion 24 by mechanical energy supplied from a separate driver (not shown) (for example, a motor) to supply mechanical energy, together with the panel driver. In this case, a part of the second portion 24 is fixed to the motor and, as such, it is possible to vary the connection length of the second portion 24 by winding or unwinding the second portion 24 onto or from a rotating shaft of the motor in accordance with rotation of the motor. In this case, the second portion 24 may be made of a material exhibiting little or no stretchability even under diverse conditions while having high yield strength. When the second portion 24 is stretchable, it is difficult to accurately vary the connection length of the second portion 24. In addition, it is necessary to provide increased mechanical energy. For example, the second portion 24 may include a metal steel wire (for example, a stainless wire), an aramid fiber, a carbon steel wire or the like. Of course, the second portion 24 may be made of various other materials. The driver, which is a motor or the like to supply mechanical energy, may have various configurations capable of varying the shape of the varying member 20. When the driver, which is a motor or the like, varies the shape of the varying member 20, using mechanical energy, it is possible to easily vary the shape of the varying member 20 while accurately controlling the variation degree and variation time of the varying member 20.

The second portion 24 may have a diameter of 0.5 to 10 mm. When the diameter of the second portion 24 is less than 0.5 mm, there may be a problem in that the second portion 24 may snap or deform upon receiving energy from the driver. On the other hand, when the diameter of the second portion 224 exceeds 10 mm, there may be problems of increased costs and complicated configurations because mechanical energy required to vary the connection length of the second portion 24 should be increased. Of course, the present invention is not limited to the above-described embodiment, and the second portion 24 may have various diameters.

Although only one second portion 24 is provided in association with the first portion 22 in the illustrated embodiment, a plurality of second portions 24 may be provided. That is, various alternatives may be employed.

The first portion 22 is fixed, at a central region thereof, to the display module 10 (for example, the support member 14) such that it cannot move at the central region. In this case, the first portion 22 is movable at opposite end regions thereof. Since the first portion 22 is movable at the opposite end regions thereof while being fixed at the central region thereof, the shape of the first portion 22 is variable.

The first portion 22 is fixed at the central region thereof by a central fixing member 26a such that it cannot move. The distance between the central region of the first portion 22 and the central region of the support member 14, namely, a first distance L1, may be greater than the distance between each end region of the first portion 22 and the corresponding end region of the support member 14, namely, a second distance L2. For example, the first portion 22 may be bent such that the central region of the first portion 22 is protruded further rearwards from the display module 10, as compared to other regions of the first portion 22 and, as such, the first portion 22 has a curved structure. Then, when the display module 10 is varied in shape, for example, to have a predetermined radius of curvature R throughout the entirety thereof in accordance with variation in the connection length of the second portion 24, shape variation of the display module 10 can be more easily achieved. See FIG. 6(b).

The central fixing member 26a includes a bracket 260a for spacing the first and second portions 22 and 24 from each other while spacing the first portion 22 from the support member 14, and fastening members 262a for fastening the bracket 260a or first portion 22 to the support member 14.

The bracket 260a functions to space the first portion 22 from the support member 14 such that the distance between the first portion 22 and the support member 14 is greater at the central region of the first portion 22 than at each end region of the first portion 22. Accordingly, the central region of the first portion 22 is maintained in a state of being protruded further from the rear surface of the display module 10 than each end region of the first portion 22. In addition, since the second portion 24 is disposed between the bracket 260a and the support member 14, the bracket 260a spaces the first and second portions 22 and 24 from each other such that the distance between the first and second portions 22 and 24 at the central region (namely, the first distance L1) is relatively great, as compared to distances at other regions of the first and second portions 22 and 24. When the area between the first and second portions 22 and 24 increases, bending moment is increased. In this case, it is possible to easily achieve shape variation of the first portion 22 in accordance with a variation in the connection length of the second portion 24. In the illustrated embodiment, accordingly, it is possible to increase the area between the first and second portions 22 and 24 by spacing the first and second portions 22 and 24 from each other such that the distance between the first and second portions 22 and 24 at the central region (namely, the first distance L1) is relatively great, as compared to distances at other regions of the first and second portions 22 and 24. Thus, it may be possible to more easily achieve shape variation of the second portion 24.

For example, the thickness of the bracket 260a, namely, a thickness T1 (corresponding to the first length L1 between the first and second portions 22 and 24), may be 10 to 50 mm. When the thickness T1 of the bracket 260a exceeds 50 mm, the display apparatus 100 is excessively thickened, and the first portion 22 may exhibit degraded structural stability. On the other hand, when the thickness T1 of the bracket 260a is less than 10 mm, bending moment may be insufficient. In this case, much energy may be required to vary the shape of the first portion 22. Of course the present invention is not limited to the above-described conditions. The thickness T1 of the bracket 260a may be varied in accordance with the size of the panel, the radius of curvature R of the panel, and etc.

Each fastening member 262a may be formed in various configurations and systems to fasten the first portion 22 and support member 14 at the central region of the first portion 22. For example, a PEM nut 14a may be mounted to the support member 14, and the fastening member 262a may be fastened to the PEM nut 14a after extending through the first portion 22 and/or the bracket 260a. Accordingly, it is possible to easily and simply fix the first portion 22 to the support member 14. Of course, the present invention is not limited to the above-described structures, and various fixing methods and structures may be employed for fixing of the first portion 22 to the support member 14.

In addition, in the illustrated embodiment, each end of the first portion 22 is spaced from the corresponding lateral end of the display module 10 by a predetermined distance D1. For example, the distance D1 between each end of the first portion 22 and the corresponding lateral end of the display module 10 may be 1 to 30 mm. When the distance D1 exceeds 30 mm, it may be difficult to uniformly apply force to the display module 10, for instance, at the edges of the display module 10. On the other hand, when the distance D1 is less than 1 mm, the first portion 22 may protrude outside of the display module 10 during shape variation thereof. When another element is disposed on the shape variation path of the first portion 22, it may interfere with shape variation of the first portion 22. Of course, the present invention is not limited to the above-described conditions. The distance D1 may be varied in accordance with the size of the panel, the radius of curvature R of the panel, and etc.

The second portion 24 is fixed, at opposite ends thereof, to respective opposite ends of the first portion 22 and, as such, the distance between the opposite ends of the second portion 24 becomes the connection length of the second portion 24. The opposite ends of the second portion 24 may be fixed to respective opposite ends of the first portion 22 by an end fixing member 26b. The fixing member 26b may include a first end fixing member 261b for fixing one end of the second portion 24 to one end of the first portion 22, and a second end fixing member 262b for fixing the other end of the second portion 24 to the other end of the first portion 22.

The end fixing member 26b may fix the second portion 24 to the first portion 22 in various manners. For example, the end fixing member 26b may have a thickness smaller than the bracket 260a of the central fixing member 26a. In this case, the second portion 24 may extend through a portion of the end fixing member 26b to become embedded. Alternatively, it may be possible to fix each end of the second portion 24 to the corresponding end of the first portion 22 by forming a hole at the end of the first portion 22, extending the end of the second portion through the hole, and then filling the hole with an adhesive or a seal. Of course, the present invention is not limited to the above-described method, and various other methods may be employed.

Accordingly, the spacing between each end of the first portion 22 and the corresponding end of the second portion 24 may have a distance smaller than the first distance L1, namely, the second distance L2. As a result, bending moment generated in accordance with a variation in the connection length of the second portion 24 may be increased and, as such, the first portion 22 may be easily varied.

Each end of the second portion 24 fixed by the end fixing member 26b may be spaced from the display module 10 by a third distance L3(the thickness of the end fixing member 26b). In accordance with this spacing, it is possible to prevent the end of the second portion 24 from interfering with the display module 10. In particular, the spacing between the second portion 24 and the display module 10 is reduced when the shape of the display module 10 is varied in accordance with a variation in the connection length of the second portion 24. The third distance L3 is determined, taking into consideration such spacing reduction. For example, the third distance L3 may be 1 to 10 mm. When the third distance L3 exceeds 10 mm, the display apparatus 100 may be undesirably thickened. On the other hand, when the third distance L3 is less than 1 mm, the end of the second portion 24 may interfere with the display module 10. Of course, the present invention is not limited to the above-described conditions. Various alternatives may be employed.

An interference-preventing fixing member 26c may be disposed in a region between the central fixing member 26a and each end fixing member 26b, to fix the second portion 24 to the first portion 22 in the region, thereby preventing the second portion 24 from interfering with the display module 10. The interference-preventing fixing member 26c may include a first interference-preventing fixing member 261c disposed between the central fixing member 26a and the first end fixing member 261b, and a second interference-preventing fixing member 262c disposed between the central fixing member 26a and the second end fixing member 262b.

The distance between the first and second portions 22 and 24 may be gradually reduced in a direction from the central fixing member 26a to the interference-preventing fixing member 26c by the interference-preventing fixing member 26c. Accordingly, the distance between the second portion 24 and the display module 10 may gradually increase in a direction from the central fixing member 26a to the first interference-preventing fixing member 261c, and then may gradually decrease in a direction from the first interference-preventing fixing member 261c to the end fixing member 261b. Similarly, the distance between the second portion 24 and the display module 10 may gradually increase in a direction from the central fixing member 26a to the second interference-preventing fixing member 262c, and then may gradually decrease in a direction from the second interference-preventing fixing member 262c to the end fixing member 262b.

In this case, sections, which constitute a central region of the second portion 24, and are gradually spaced away from the rear surface of the display module 10 as they extend toward corresponding ends of the second portion 24, may be referred to as "central sections S11 and S12". On the other hand, sections, which are disposed outside the central sections S11 and S12 while gradually approaching the rear surface of the display module 10 as they extend toward the corresponding ends of the second portion 24, may be referred to as "outer sections S21 and S22".

In this case, the central sections S11 and S12 may include a first central section S11 defined between the central fixing member 26a and the first interference-preventing fixing member 261c, and a second central section S12 defined between the central fixing member 26a and the second interference-preventing fixing member 262c. The first central section S11 and second central section S12 may have structures symmetrical with respect to where the central fixing member 26a is disposed, respectively. In accordance with such structures, values of bending moment at opposite sides of the central region may be equal and, as such, it is possible to prevent the display module 10 from bending asymmetrically.

Similarly, the outer sections S21 and S22 may include a first outer section S21 defined between the first interference-preventing fixing member 261c and the first end fixing member 261b, and a second outer section S22 defined between the second interference-preventing fixing member 262c and the second end fixing member 262b. The first outer section S21 and second outer section S22 may have structures symmetrical with respect to where the central fixing member 26a is disposed, respectively. In accordance with such structures, values of bending moment at opposite sides of the central region may be equal and, as such, it is possible to prevent the display module 10 from bending asymmetrically.

In accordance with the above-described structures, the second portion 24 may have a shape similar to "W". In accordance with this shape, it is possible to prevent problems as to interference while obtaining maximum bending moment.

The ratio of the first central section S11 (or the second central section S12) to the total length L of the first portion 22 may be 0.1 to 0.2. When the length ratio is less than 0.1, bending moment, which is proportional to the area between the first and second portions 22 and 24, may be insufficient. On the other hand, when the length ratio exceeds 0.2, the second portion 24 may interfere with the display module 10. Of course, the present invention is not limited to the above-described conditions, and the length ratio is variable.

Since the distance between the second portion 24 and the display module 10 increases gradually in the central sections S11 and S12 by the interference-preventing fixing member 26c, as described above, it is possible to prevent the second portion 24 from interfering with the display module 10. Accordingly, there is no interference with shape variation. In addition, it is possible to transmit high bending moment to the first portion 22 by optimizing the length ratio of the central sections S11 and S12.

When it is assumed that the area between the first and second portions 22 and 24 in each of the central sections S11 and S12 is a first area A1, and the area between the first and second portions 22 and 24 in each of the outer sections S21 and S22 is a second area A2, the ratio of the first area A1 to the second area A2 may be 16 to 400. This area ratio is determined such that the sum of the first and second areas A1 and A2, "A1+A2" has a maximum value under the condition that there is no interference between the display module 10 and the second portion 24, taking into consideration the fact in which bending moment is proportional to the sum "A1 +A2" of the first and second areas A1 and A2. Of course, the present invention is not limited to such conditions, and the area ratio may be varied in accordance with the area of the display module 10, the radius of curvature R of the display module 10, and etc.

The central fixing member 26a, end fixing member 26b, and interference-preventing fixing member 26c may be made of various materials. These members may be made of a material capable of achieving easy fixing while preventing the second portion 24 from being damaged. For example, the members may be made of a material such as resin (for example, polyphenyl amide). Of course, the present invention is not limited to such materials.

The first portion 22 may be movably held by the guide members 28 fixed to the support member 14. Accordingly, it is possible to movably hold the first portion 22 while preventing the first portion 22 from being downwardly bent.

Each guide member 28 includes an upper portion 28a spaced from the support member 14, to form a predetermined space therebetween, and side portions 28b bent from the upper portion 28a, to be disposed adjacent to the support member 14. The side portions 28b are fixed to the support member 14 by fastening members 28c. For example, fixing of each guide member 28 to the support member 14 may be achieved by mounting PEM nuts (not shown) to the support member 14, and fastening the fastening members 28c, which may be screws or the like, to the PEM nuts through fastening holes formed at the side portions 28b. Using the PEM nuts and screws as described above, it is possible to easily and simply achieve fastening. Of course, the present invention is not limited to the above-described structures, and various fixing methods and structures may be employed for fixing of the side portions 28b to the support member 14.

Since the distance between the first portion 22 and the display module 10 increases gradually toward the central region, the guide member 28 may be formed such that each upper portions 28a thereof has a height increasing gradually toward the central region. In this case, the first portion 22 may be freely laterally movable while being effectively supported by the guide members 28.

The ratio of the distance D2, by which each guide member 28 is spaced from the corresponding end of the first portion 22, to the total length L of the first portion 22, D2/L, may be 0.2 to 0.4. This distance ratio is determined to firmly hold the first portion 22 such that the first portion 22 is prevented from being downwardly bent at the opposite end regions thereof. Of course, the present invention is not limited to such conditions.

When the connection length of the second portion 24 varies, as described above, the shape of the first portion 22 is varied. When the shape of the first portion 22 varies, the first portion 22 applies force to the display module 10, thereby causing the shape of the display module 10 to be correspondingly varied. Thus, the first portion 22 is a portion which is varied in shape by force received from the second portion 24, thereby varying the shape of the display module 10. In this regard, the first portion 22 may include a material having flexibility and excellent strength. In addition, the material of the first portion 22 may be lightweight in order to reduce the weight of the display apparatus 100. The above-described structure and material of the first portion 22 will be described in more detail later with reference to FIGS. 4 and 5.

In an exemplary embodiment, the varying member 20 may be elongated in one direction (for example, a lateral direction of the display apparatus 100). When the connection length of the second portion 24 is reduced, the first portion 22 is bent such that the opposite end regions thereof protrude forward with respect to the central region. As a result, the display module 10 is deformed into a curved structure having a predetermined radius of curvature ("R" in FIG. 6) in the lateral direction of the display module 10. In this state, there is no difference in the distance from the eyes of the user to the display panel 12 between the middle and lateral end portions of the display panel 12. Even if there is a distance difference, such difference may be minute. Thus, it is possible to achieve an enhancement in sensory immersion of the user. Of course, the present invention is not limited to the above-described embodiment. For example, the varied shape of the varying member 20 may be different from the above-described shape and, as such, the varied shape of the display module 10 may also be different from the above-described shape.

In the illustrated embodiment, two varying members 20 are provided such that one varying member 20 is disposed at an upper portion of the display module 10, and the other varying member 20 is disposed at a lower portion of the display module 10. While a single varying member 20 may be disposed at an intermediate portion of the display module 10, insufficient shape variation may occur at upper and lower edge portions of the display module 10. When a plurality of varying members 20 is provided, it is possible to achieve uniform shape variation throughout the entirety of the display module 10. Of course, the present invention is not limited to the above-described arrangement, and various alternatives may be employed. For example, only one varying member 20 is provided for cost reduction and structure simplification. On the other hand, three or more varying members 20 may be provided, taking into consideration the case in which the display module 10 has a large size.

The rear cover 30 is disposed in rear of the display module 10 and varying member 20. The rear cover 30 protects the display module 10, panel driver, and etc., from external impact while providing a space where the panel driver, and etc., are disposed. The rear cover 30 also covers the panel driver, and etc., to prevent an inner configuration of the display module 10 from being outwardly exposed, and thus to achieve an enhancement in appearance. For example, the rear cover 30 has a surface gently curved throughout the rear cover 30, to secure a sufficient space and to achieve an enhancement in appearance. In an exemplary embodiment, the rear cover 30 includes a material, a structure, or the like capable of coping with a variation in shape of the display module 10.

Figure 4:
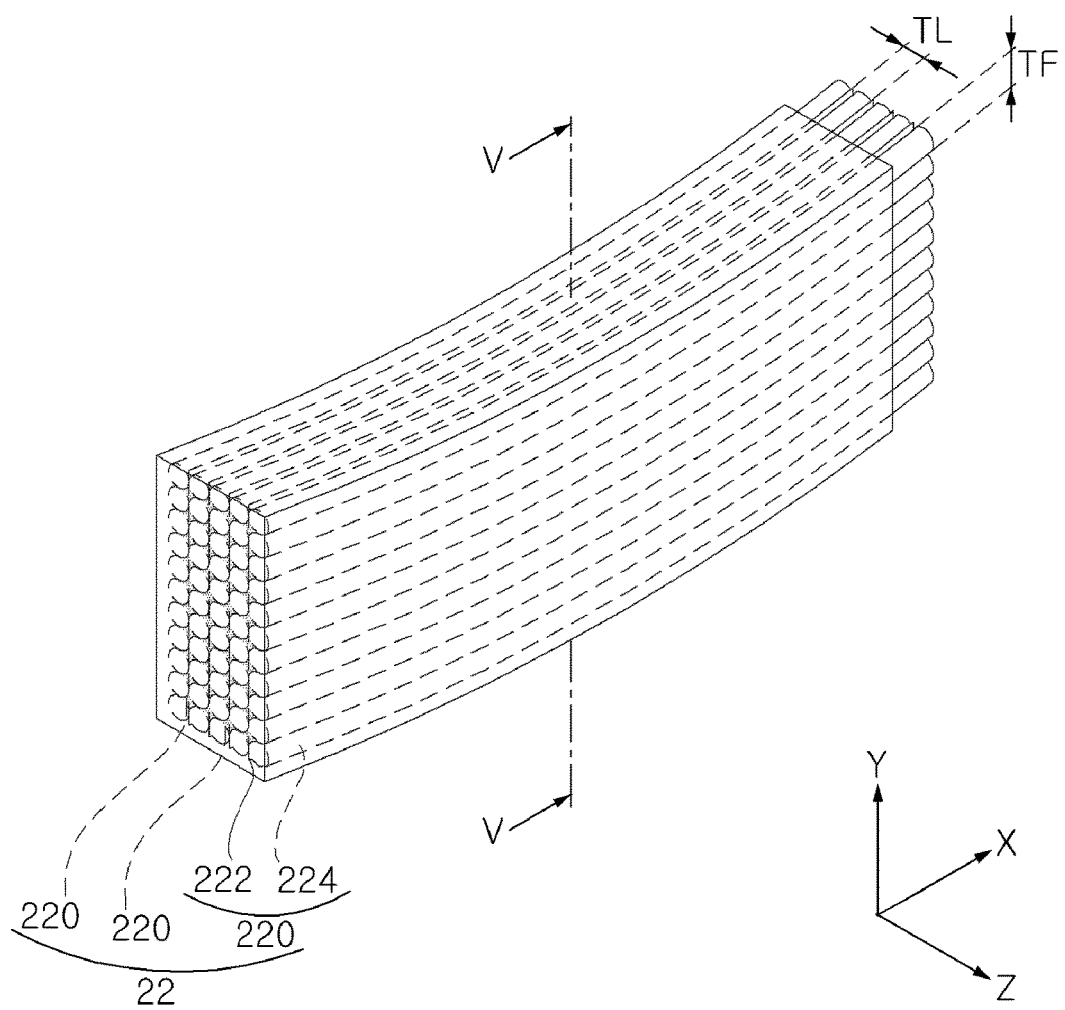
FIG. 4 is a perspective view illustrating a part of a first portion in the display apparatus according to the illustrated embodiment of the present invention.
Figure 5:
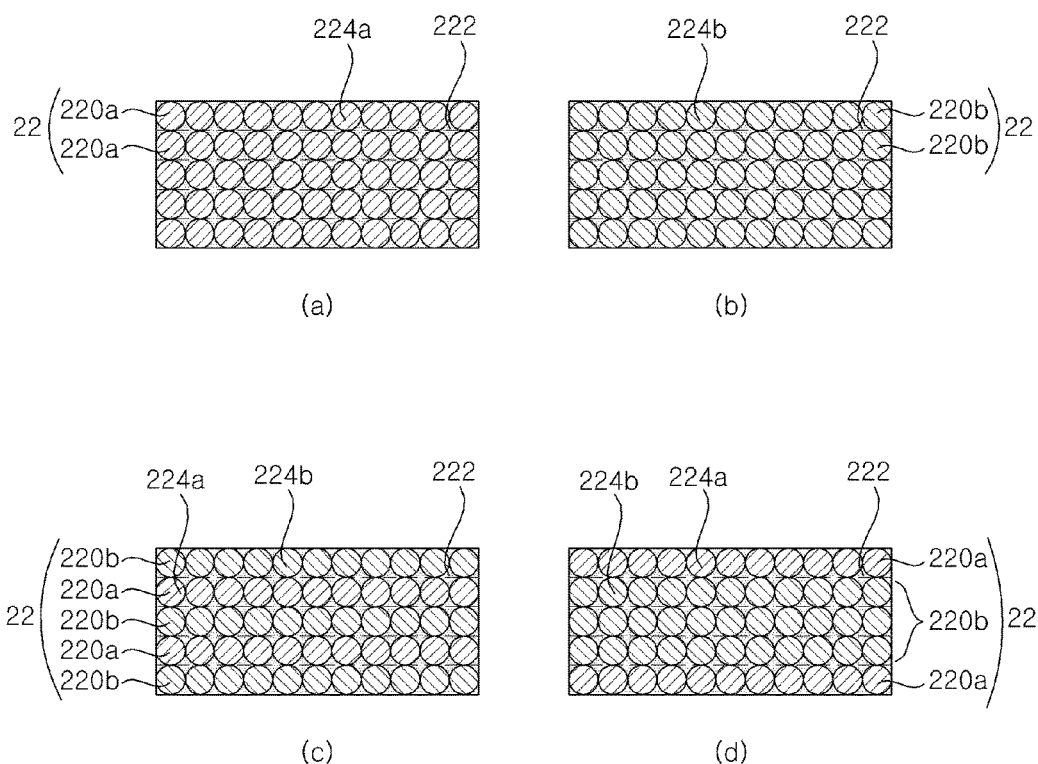
FIGS. 5(a)-5(d) illustrate cross-sectional views of various examples of the first portion taken along line V-V of FIG. 4.

The structure and material of the first portion will be described in more detail with reference to FIGS. 4 and 5. FIG. 4 is a perspective view illustrating a part of the first portion in the display apparatus according to the illustrated embodiment of the present invention. FIG. 5 illustrate cross-sectional views of various examples of the first portion taken along line V-V of FIG. 4.

Referring to FIG. 4, the first portion 22 may include at least one composite material layer 200 made of a composite material. The composite material is a material obtained by artificially combining two or more kinds of materials, to exhibit excellent characteristics. That is, the composite material layer 200 includes a matrix 222, and a reinforcing material 224 embedded in the matrix 222. In the illustrated embodiment, for example, the matrix 222 may include resin, and the reinforcing material 224 may include fibers. The first portion 22 may exhibit not only characteristics of lightness and flexibility by virtue of the resin used as the matrix 222, but also high strength, high elasticity, and excellent wear resistance by virtue of the reinforcing material 224. When the reinforcing material 224 is constituted by fibers, it may have certain directionality. This will be again described later.

The resin used as the matrix 222 may be, for example, epoxy resin. Epoxy resin may be stably coupled with fibers by virtue of high adhesion ability thereof. Epoxy resin also exhibits excellent resistance to moisture and chemical materials and, as such, exhibits excellent durability. By virtue of high flexibility and strength of epoxy resin, the first portion 22 may exhibit smooth shape variation while maintaining at least desired strength. Fibers used as the reinforcing material 224 may include, for example, carbon fibers or glass fibers. Carbon fibers have high strength and, as such, the display module 10 may be varied in shape in accordance with shape variation of the first portion 22. Glass fibers are inexpensive, and may have proper characteristics in accordance with the kind thereof (for example, E-glass, S-glass, D-glass, and etc.). Thus, the above-described composite material may be carbon fiber reinforced plastic (CFRP) or glass fiber reinforced plastic (GFRP). Of course, the present invention is not limited to the above-described materials. Various materials may be used as the matrix 222 and reinforcing material 224.

The first portion 22 may include a plurality of reinforcing materials 224 arranged in parallel in one direction. In this case, the plural reinforcing materials 224 may be in contact with one another or may be spaced apart from one another by a slight distance. When the reinforcing materials 224 are arranged in parallel in one direction, the composite material layer 220 may be constituted by uni-directional fiber reinforced plastic. In more detail, the reinforcing materials 224 may be arranged to be connected in the lateral direction of the display module 10. In this case, accordingly, the first portion 22 may apply increased force to the display module 10 when the first portion 22 is curved to have a certain radius of curvature in the lateral direction of the display module 10. That is, it may be possible to more smoothly deform the display module 10 into a curved structure.

When the first portion 22 includes the composite material layer 220, which includes a composite material, as described above, the first portion 22 may have desired characteristics. This will be described in more detail. The first portion 22 should be variable in shape, to vary the shape of the display module 10. In this regard, the first portion 22 should be easily variable in shape when such shape variation is required. Furthermore, the first portion 22 should be prevented from being deformed into an undesirable shape, upon deforming the display module 10. To this end, the first portion 22 should not only have flexibility, but also have high strength. For example, the first portion 22 should have higher strength than the support member 14 constituting the display module 10 so as to achieve smooth deformation of the support member 14. In addition, the first portion 22 should have a coefficient of thermal expansion similar to that of the display module 10 (in particular, the support member 14) in order to avoid thermal stress. In the illustrated embodiment, the first portion 22 is made of a composite material and, as such, may satisfy desired characteristics such as flexibility, high strength, and a coefficient of thermal expansion similar to that of the support member 14.

The composite material layer 220, which is made of the above-described composite material, may be formed by arranging fibers in parallel in one direction, impregnating resin around the fibers, and compressing the resultant structure at high temperature and pressure. Formation of the composite material layer 220, which includes uni-directional fiber reinforced plastic, may be achieved, using a conventional method, and, as such, no detailed description thereof will be given. Since the resin is compressed in accordance with compression at high temperature and pressure, the thickness of the composite material layer 220 depends on the diameter of the fibers as the reinforcing material 224. Thus, the thickness of the composite material layer 220, namely, a thickness TL, is similar to the diameter of the fibers as the reinforcing material 224, namely, a thickness TF.

The diameter of the fibers as the reinforcing material 224 may be 0.1 to 0.4 mm. For example, the diameter of the fibers may be 0.2 to 0.4 mm. When the fibers have a reduced diameter, the composite material may exhibit enhanced physical properties because the weight ratio of the fibers increases. However, when the fibers have a reduced diameter, the costs thereof increase greatly. For this reason, use of fibers having a diameter of less than 0.1 mm is impractical. Mainly taking costs into consideration, fibers having a diameter of 0.2 mm or more may be used. On the other hand, when the diameter of the fibers is greater than 0.4 mm, the composite material exhibits degraded physical properties because the weight ratio of the fibers is excessively reduced. In accordance with the above-described fiber diameter, the thickness of the composite material layer 220 may be 0.1 to 0.4 mm. For example, the thickness of the composite material layer 220 may be 0.2 to 0.4 mm. Of course, the present invention is not limited to the above-described values. For example, the composite material layer 220 may be formed to have various thicknesses, using fibers having various diameters.

For example, when the amount of the composite material layer 220 is 100 weight parts, the content of the reinforcing material 224 (for example, fibers) included in the composite material layer 220 may be 50 to 70 weight parts. When the content of the reinforcing material 224 is less than 50 weight parts, the composite material layer 220 may exhibit insufficient strength. When the content of the reinforcing material 224 exceeds 70 weight parts, the composite material layer 220 may exhibit degraded flexibility. The content of the reinforcing material 224 may be increased through a reduction in the diameter of the reinforcing material 224. In this case, however, costs may be greatly increased. Of course, the present invention is not limited to the above-described conditions. For example, the content of the reinforcing material 224 may be varied in accordance with the diameter of the reinforcing material 224 or the pitch (spacing) of the reinforcing material 224.

The first portion 22 may include a plurality of stacked composite material layers 220 in order to more easily vary the shape of the display module 10. When the cost and physical properties of the composite material layer 220 are taken into consideration, there is a limitation on the diameter TF of the reinforcing material 224 (for example, fibers) and, as such, there is a limitation on the thickness TL of the composite material layer 220. As a result, there is a limitation on the strength of the composite material layer 220. To this end, the first portion 22 is formed through stacking of a plurality of composite material layers 220 and, as such, may have high strength to achieve shape variation of the display module 10. Formation of the first portion 22 through stacking of a plurality of composite material layers 220 may be achieved, using various methods. For example, the first portion 22 may be formed to have a unified structure by stacking a plurality of composite material layers 220, and applying heat and pressure to the stacked composite material layers 220. Of course, the present invention is not limited to such a method, and the first portion 22 may be formed, using various methods.

The stacking number of composite material layers 220 may be determined, taking into consideration the flexural modulus of elasticity required in the first portion 22. That is, the first portion 22 may have a flexural modulus of elasticity required to provide, to the display module 10, force required for shape variation of the display module 10 into a curved structure. The force required for shape variation of the display module 10 is a factor associated with the strength, thickness, and size of the display panel 12, the strengths, thicknesses, and sizes of the front glass, frame, etc. of the display panel 12, the strength of the support member 14, etc. In particular, the force required for shape variation of the display module 10 is increased as the above-described strengths, thicknesses, and sizes increase. When such factors are taken into consideration, the first portion 22 should have a flexural modulus of elasticity ranging from 40 GPa to 130 GPa in order to vary the shape of the display module 10. Accordingly, the stacking number of composite material layers 220 is determined to be a number enabling the first portion 22 to have a flexural modulus of elasticity ranging from 40 GPa to 130 GPa.

For example, when the diameter TF of the reinforcing material 224 or the thickness TL of the composite material layer 220 is 0.1 to 0.4 mm (for example, 0.2 to 0.4 mm), the first portion 22 may have a flexural modulus of elasticity ranging from 40 GPa to 130 GPa under the condition that 5 to composite material layers 220 are stacked. In this case, the first portion 22 may have a thickness of 1.0 to 4.8 mm.

Of course, the present invention is not limited to the above-described conditions. For example, the flexural modulus of elasticity of the first portion 22 may be varied in accordance with the strength of the display module 10, and etc. The stacking number of composite material layers 220 may also be varied in accordance with the range of flexural modulus of elasticity, the thickness of each composite material layer 220, the kinds of the matrix 222 and reinforcing material 224, and the content of the reinforcing material 224.

The flexural modulus of elasticity of the first portion 22 may be adjusted by adjusting the stacking order and method of the composite material layers 220. That is, when it is desired to obtain high strength, the first portion 22 may be formed by stacking a plurality of first composite material layers 220a each including carbon fiber reinforced plastic including a matrix 222 and carbon fibers 224a, as illustrated in FIG. 5(a). In another embodiment, as illustrated in FIG. 5(b), the first portion 22 may be formed by stacking a plurality of second composite material layers 220b each including glass fiber reinforced plastic including a matrix 222 and carbon fibers 224b. In another embodiment, as illustrated in FIG. 5(c), the first portion 22 may be formed by alternately stacking first composite material layers 220a each including carbon fiber reinforced plastic including a matrix 222 and carbon fibers 224a, and second composite material layers 220b each including glass fiber reinforced plastic including a matrix 222 and carbon fibers 224b. In another embodiment, as illustrated in FIG. 5(d), when the first portion 22 include three or more composite material layers, the first composite material layer 220a, which includes carbon fiber reinforced plastic, may be used for two outer composite material layers to form outer surfaces of the first portion 22, and the second composite material layer 220b, which includes glass fiber reinforced plastic, may be used for one or more inner composite material layers arranged between the outer composite material layers. The reason why the first composite material layer 220a is arranged to form outer surfaces of the first portion 22 is that carbon fiber reinforced plastic exhibits lower difference of coefficient of thermal expansion from that of the support member 14 and more excellent appearance characteristics than those of glass fiber reinforced plastic. The first portion 22 may be formed, using various stacking methods different from the above-described stacking methods.

The above-described shape variation of the display apparatus 100 will be described in more detail with reference to FIG. 6. FIG. 6 is a view explaining shape variation of the display apparatus according to an exemplary embodiment of the present invention. For simplicity and convenience of description, illustration of the rear cover 30 is omitted from FIG. 6.

The display module 10 is kept in a flat state, as shown in FIG. 6(a), when there is no force applied to the display module 10.

The first portion 22 of the varying member 20 is fixed at the central region thereof by the fixing member 26a such that it cannot move. The first portion 22 is also disposed such that the central region of the first portion 22 is protruded further rearwards, as compared to other regions of the first portion 22. In accordance with this structure, shape variation of the display module 10 can be more easily achieved. As described above, the guide members ("28" in FIG. 2) are disposed at opposite sides of the first portion 22, to support the first portion 22 while allowing the first portion 22 to be movable.

When the user inputs a command for shape variation, energy is supplied to the second portion 24 by the panel driver or the driver, which is a motor or the like, in order to reduce the connection length of the second portion 24. That is, electrical energy or thermal energy is supplied to reduce the connection length of the second portion 24 which may be made of a shape memory alloy. Alternatively, mechanical energy is supplied to wind the second portion 24 onto the rotating shaft, and thereby reducing the connection length of the second portion 24. Then, the first portion 22 is bent throughout the entirety thereof such that the opposite end regions thereof protrude forward with respect to the central region and, as such, the shape of the display module 10 is also varied. As a result, the display module 10 is deformed into a curved structure having a uniform radius of curvature R in the lateral direction of the display module 10, as shown in FIG. 6(b). Thus, the display module 10 exhibits an enhancement in sensory immersion of the user.

In this case, the first portion 22 may satisfy various characteristic requirements of flexibility, high strength, and etc., because the first portion 22 include composite material layers 220 each including a matrix 222 and reinforcing materials 224. Since the first portion 22 includes a plurality of composite material layers 220, the first portion 22 may exhibit sufficient strength for shape variation of the display module 10. Accordingly, it may be possible not only to easily vary the shape of the first portion 22 by the second portion 23, but also to provide, to the display module 10, energy required for shape variation of the display module 10. The reinforcing materials 224 are arranged in parallel in the lateral direction of the display module 10, taking into consideration the fact that the display module 10 is deformed to have a uniform radius of curvature in the lateral direction thereof. Accordingly, it may be possible to deform the display module 10 into a desired shape, using less energy.

Although the preferred embodiments of the present invention have been disclosed for illustrative purposes, those skilled in the art will appreciate that various modifications, additions and substitutions are possible, without departing from the scope and spirit of the invention.

What is claimed is:

1. A display apparatus comprising:
   a display module and;
   a varying member which applies force to the display module to vary a shape of the display module;
   wherein the varying member comprises a first portion in direct contact with opposite end regions of the display module and a second portion disposed between the display module and the first portion, the second portion fixed, at opposite end regions thereof, to opposite end regions of the first portion,
   wherein when the distance between the opposite ends of the second portion is reduced, the first portion is bent forward, to form a concave shape, such that the opposite end regions thereof protrude forward and the display module is deformed,
   wherein the first portion comprises a plurality of stacked composite material layers made of a composite material.

2. The display apparatus according to claim 1, wherein the composite material layer comprises a matrix, and a reinforcing material embedded in the matrix.

3. The display apparatus according to claim 2, wherein the reinforcing material comprises a plurality of reinforcing materials arranged in parallel in one direction.

4. The display apparatus according to claim 3, wherein the composite material layer comprises resin as the matrix, and fibers as the reinforcing materials.

5. The display apparatus according to claim 2, wherein the composite material comprises at least one of carbon fiber reinforced plastic (CFRP) or glass fiber reinforced plastic (GFRP), which comprises resin as the matrix, and at least one of carbon fibers or glass fibers as the reinforcing material.

6. The display apparatus according to claim 1, wherein at least a part of the first portion is apart from the display module.

7. The display apparatus according to claim 1, wherein each of the composite material layers has a thickness of 0.2 mm to 0.4 mm.

8. The display apparatus according to claim 7, wherein:
   a number of the stacked composite material layers of the first portion is 5 to 12; and
   the first portion has a thickness of 1.0 mm to 4.8 mm.

9. The display apparatus according to claim 8, wherein the first portion exhibits a flexural modulus of elasticity ranging from 40 GPa to 130 GPa.

10. The display apparatus according to claim 1, wherein each of the composite material layers comprises a matrix, and a plurality of reinforcing materials arranged in parallel in one direction and embedded in the matrix.

11. The display apparatus according to claim 10, wherein:
    the matrix comprises resin, and the reinforcing materials comprises fibers; and
    the fibers has a diameter of 0.2 mm to 0.4 mm.

12. The display apparatus according to claim 10, wherein the reinforcing materials are contained in each of the composite material layers in a content of 50 to 70 weight parts based on 100 weight parts of the composite material layer.

13. The display apparatus according to claim 1, wherein:
    the varying member is variable between a first state in which the display module is kept in a flat state and a second state in which the varying member has a smaller radius of curvature than in the first state; and
    the varying member applies force to the display module when the varying member is in the second state, thereby varying the display module to have a curved structure; and
    the composite material layer comprises a matrix, and a plurality of reinforcing materials arranged in parallel in one direction and embedded in the matrix.

14. The display apparatus according to claim 13, wherein the variable member has a band shape extending laterally across the display module.

15. The display apparatus according to claim 1, wherein the first portion comprises a central region fixed to a central region of the display module, to be prevented from moving with respect to the central region of the display module, and opposite end regions not fixed to the display module or held on the display module, to be movable with respect to the display module.

16. The display apparatus according to claim 1, wherein:
    the at least one composite material layer of the first portion comprises at least three composite material layers comprising two outer composite material layers made of carbon fiber reinforced plastic and forming outer surfaces of the first portion, and at least one inner composite material layer made of glass fiber reinforced plastic and disposed between the outer composite material layers.

17. The display apparatus according to claim 1, wherein the varying member further comprises an additional variable portion fixed to opposite ends of the first portion.

18. The display apparatus according to claim 17, wherein a connection length between opposite ends of the additional variable portion is variable to vary a shape of the first portion.

19. The display apparatus according to claim 17, wherein the first portion has a greater width than the additional variable portion.

20. The display apparatus according to claim 17, wherein the additional variable portion comprises at least one of a shape memory alloy, a metal steel wire, an aramid fiber, and a carbon steel wire.

* * * * *